United States Patent [19]

Reece

[11] Patent Number: 5,083,418
[45] Date of Patent: Jan. 28, 1992

[54] HAND-OPERATED FRUIT PICKER

[75] Inventor: Doyal C. Reece, Florence, Ala.

[73] Assignee: Rigney, Garvin & Webster, P. C., North Huntsville, Ala. ; a part interest

[21] Appl. No.: 607,700

[22] Filed: Nov. 1, 1990

[51] Int. Cl.⁵ ............................................. A01D 46/24
[52] U.S. Cl. ..................................... 56/239.0; 56/333; 56/335; 56/339; 56/DIG. 18
[58] Field of Search ................. 56/332, 239, 333, 334, 56/335, 336, 339, 340, DIG. 18

[56] References Cited

U.S. PATENT DOCUMENTS

| | | | |
|---|---|---|---|
| 606,524 | 6/1898 | Drysdale et al. | 56/333 |
| 1,040,947 | 10/1912 | Hughes | 56/334 |
| 1,070,204 | 8/1913 | Sweeney | 56/333 |
| 1,415,945 | 5/1922 | Moore | 56/333 |
| 1,968,414 | 7/1934 | Melown | 56/334 |
| 4,531,352 | 7/1985 | Henningsgaard | 56/336 |
| 4,835,955 | 6/1989 | Gaubis | 56/334 |

FOREIGN PATENT DOCUMENTS 1053851  3/1959  Fed. Rep. of Germany ........ 56/332

*Primary Examiner*—Terry Lee Melius
*Attorney, Agent, or Firm*—John C. Garvin, Jr.

[57] ABSTRACT

A portable hand-operated fruit picker for mounting on a telescoping pole having a container or bag at one end thereof for receiving the fruit when removed from a tree. The portable hand-operated fruit picker consists primarily of a telescoping pole, a first hoop member fixed to the distal end of the upper section of the telescoping pole, a second hoop member pivotally mounted to the upper section of the telescoping pole adjacent its distal end, a container or bag fixed to the second hoop member, and a member for actuating the second hoop member relative to the first hoop member to facilitate the fruit picking process.

9 Claims, 4 Drawing Sheets

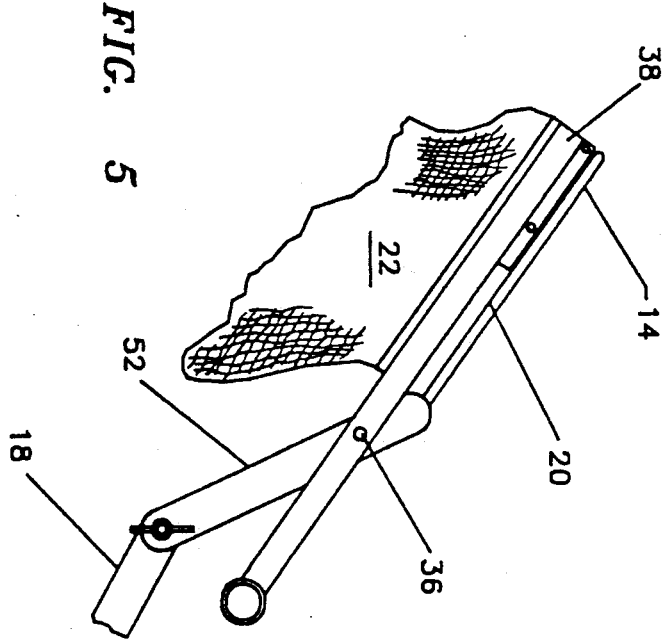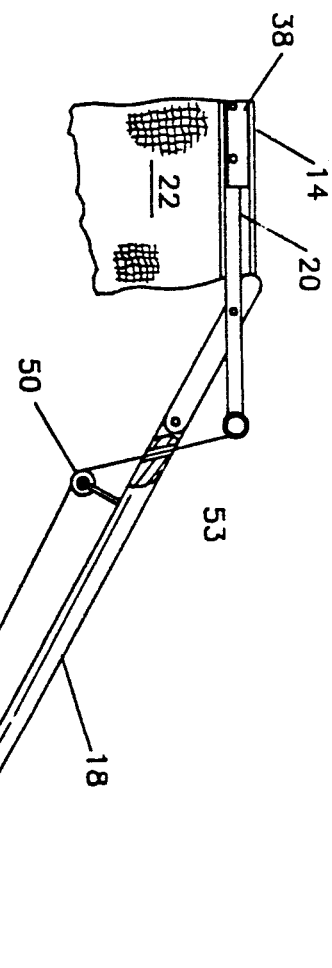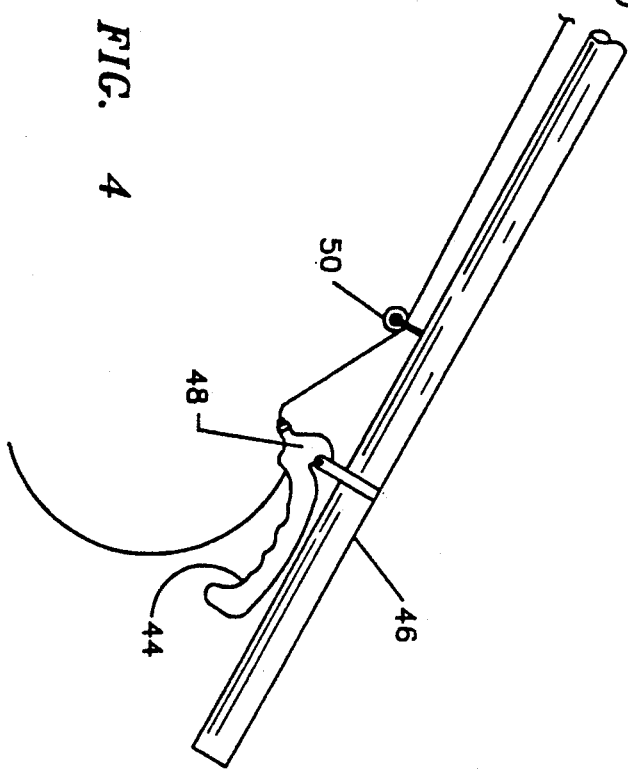

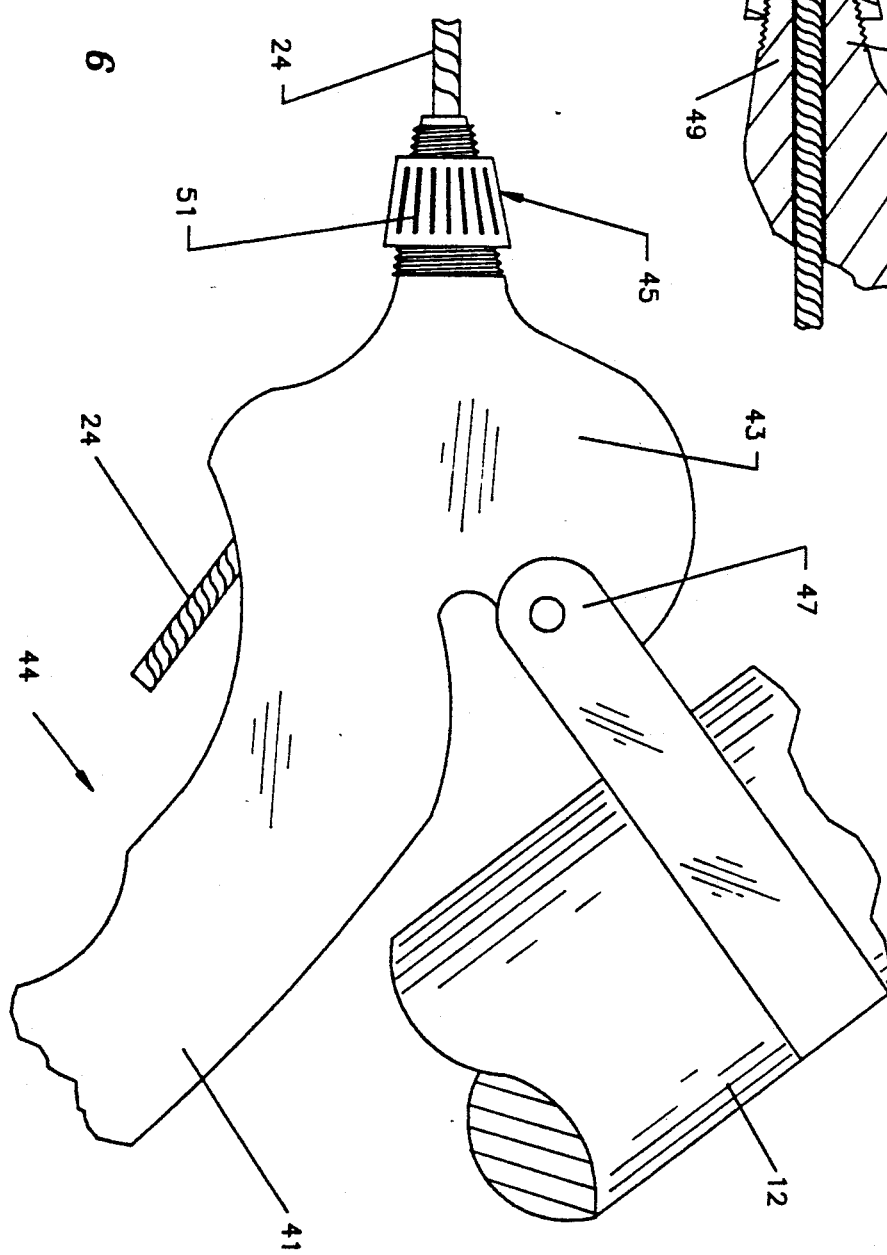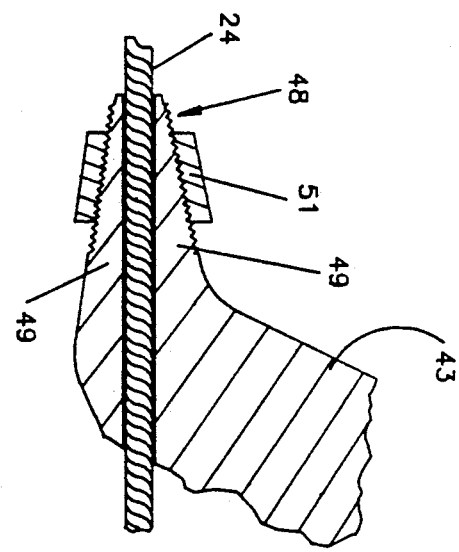

HAND-OPERATED FRUIT PICKER

FIELD OF THE INVENTION

This invention relates to an improved fruit picker and more particularly to a fruit picker which is mounted on a pole, is hand-operated and has a container or bag for receiving the fruit when removed from a tree. The present invention has application in substantially every situations wherein fruits of all kinds are growing on tree limbs which are too high for a person to reach to gather or pick the fruit from the tree when standing at ground level.

BACKGROUND OF THE INVENTION

The prior art abounds with hand-operated devices secured to a pole for picking or gathering fruit such as apples, peaches, pears, oranges and tangerines from tree limbs which are too high to reach by a person from ground level. U.S. Pat. Nos. 47,364, 591,113, 640,485, 850,355, 937,797, 1,586,867, 1,968,414, 3,744,227 and 4,835,955 exemplify such prior art devices and constitute the closest prior art known to the present invention. These pole mounted devices for picking fruit from the uppermost limbs of fruit trees by a person located on the ground have not been generally commercialized or accepted due to their usually complex structures including complicated and separate clipper mechanisms for severing the fruit from tree limbs.

The instant invention relates to an easily actuated fruit picker having a minimum number of moving parts mounted preferably on a telescoping pole, for removing fruit from the uppermost limbs of a tree by a person at ground level.

It is an object of the present invention to provide a portable, lightweight, fruit picker which can be easily and conveniently manipulated by a person standing at ground level.

It is a further object of this invention to provide an improved fruit picker having a container mounted near its upper extremity to catch the fruit when picked from a tree by a person standing on the ground.

It is still a further object of this invention to provide a new and improved portable, lightweight, fruit picker which is simple in construction and operation and capable of accommodating a variety of fruits of different sizes with little or no modifications.

Other aspects, objects, and the several advantages of this invention will become apparent to those skilled in the art to which this invention pertains from a study of the preferred embodiments as set forth in the following specification and drawings and the appended claims.

BRIEF DESCRIPTION OF THE DRAWINGS

FIG. 4 is a side elevational view of the portable hand-operated fruit picker of the present invention showing a second embodiment utilizing a pole mounted handle for actuating the fruit picker.

FIG. 5 is a side elevational view of an extension for use with the portable hand-operated fruit picker of the present invention which permits an adjustment to the invention shown in a first position.

FIG. 6 is an enlarged elevational view of the handle assembly shown secured to the pole of the embodiment illustrated in FIG. 1.

FIG. 7 is a sectional view of the handle assembly of FIG. 7 and illustrates the rope gripping mechanism associated with the handle assembly.

DESCRIPTION OF THE PREFERRED EMBODIMENTS

Figure 1:
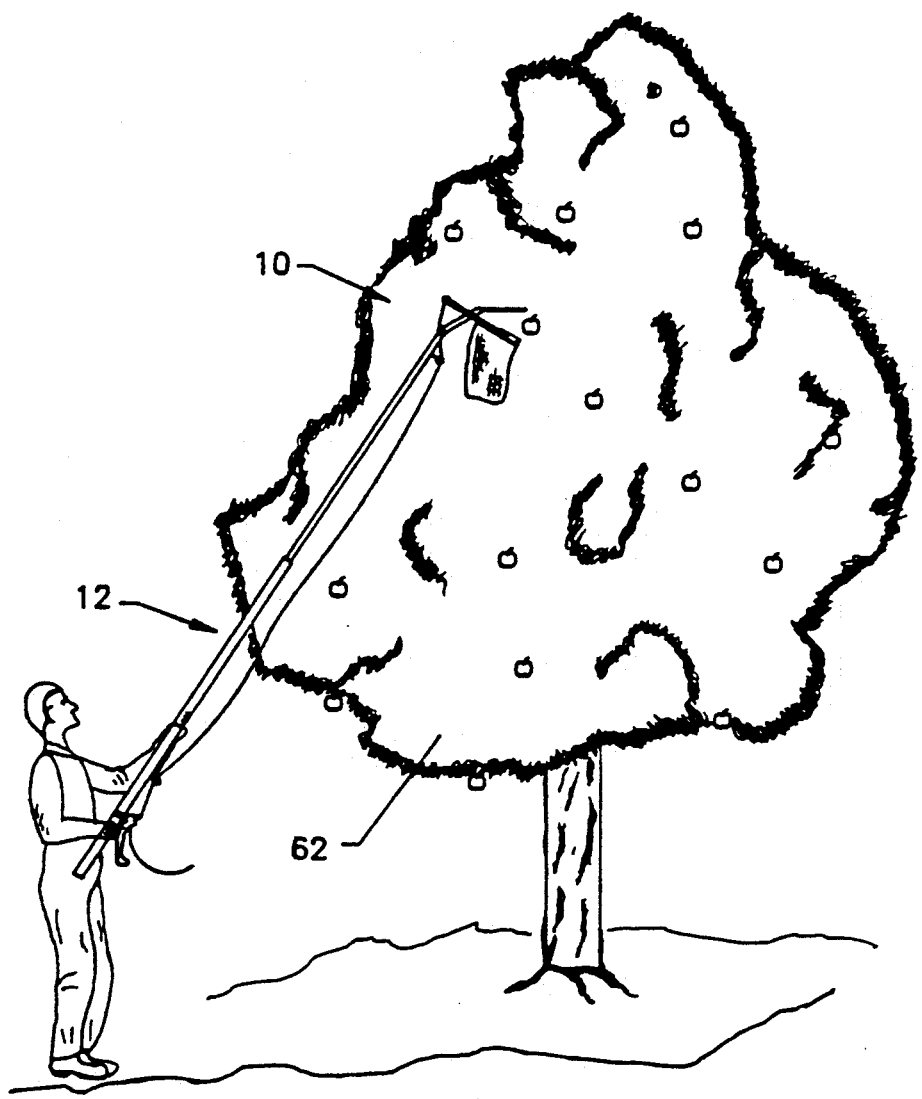
FIG. 1 is a side elevational view of the preferred embodiment of the portable hand-operated fruit picker of the present invention showing the upper end thereof in a fruit engaging position.
Figures 2, 3:
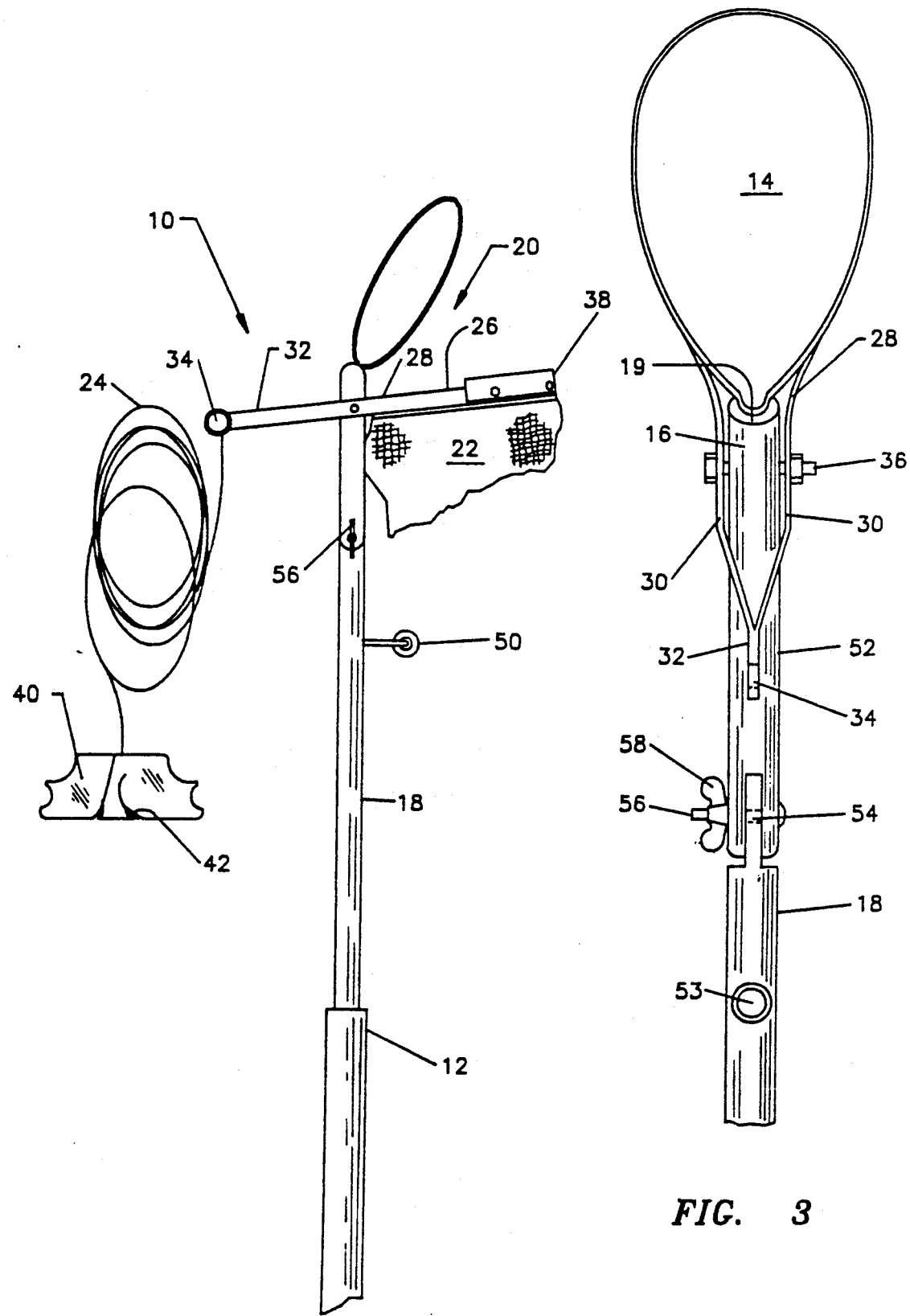
FIG. 2 is an enlarged side elevational view of the preferred embodiment of the portable hand-operated fruit picker of the present invention showing its upper operating parts in greater detail.
FIG. 3 is an enlarged side elevational view of the preferred embodiment of the portable hand-operated fruit picker of the present invention taken at an angle of approximately ninety degrees to FIG. 2 showing its upper operating parts in greater detail.

Referring now to the drawings, and particularly FIGS. 1-3 thereof, the numeral 10 designates generally the portable hand-operated fruit picker of the present invention consisting primarily of a telescoping pole 12, a first hoop member 14 fixed to the distal end 16 of the upper section 18 of telescoping pole 12, a second hoop member 20 pivotally mounted to upper section 18 of telescoping pole 12 adjacent its distal end 16, a container or bag 22 fixed to second hoop member 20, and a member 24 for actuating second hoop member 20 relative to first hoop member 14 to facilitate the fruit picking process.

The first hoop member 14 is generally circular in configuration and is attached to distal end 16 of upper section 18 of telescoping pole 12 by weld 19, nuts and bolts, rivets, or any other conventional means depending upon the material that first hoop member 14 is formed from. First hoop member 14 may be formed of metal, plastic or any other suitable material and may be round, flat or of other shape in cross section and is preferably attached to the distal end 16 of upper section 18 of pole 12 at an angle of approximately 130 to 160 degrees relative to pole 12. The angular attachment of first hoop member 14 to the upper section 18 of pole 12 defines a nonplanar relationship between first hoop member 14 and pole 12.

Second hoop member 20 has a generally circular first section 26 of a diameter or size substantially the same as that of the circular configuration of first hoop member 14 and a second intermediate section 28 for pivotal attachment to upper section 18 of telescoping pole 12. In the preferred embodiment of the invention as shown in FIGS. 1-3, intermediate second section 28 of second hoop member 20 includes substantially parallel side members 30 fixed to generally circular first section 26 at one end and converging at its other end where side members 30 join to form a third section 32 of second hoop member 20 having an opening 34 therein. The substantially parallel side members 30 of intermediate second section 28 of second hoop member 20 are pivotally secured to upper section 18 of telescoping pole 12 by nuts and bolts, rivets or any other conventional means 36. Container or bag 22 is attached to the generally circular first section 26 of second hoop member 20 by twine, thread, wire, adhesives or any conventional means and may be of a size to hold a single or infinite number of pieces of fruit. The generally circular first section 26 of second hoop member 20 may be sharpened or have a knife 38 attached thereto for severing the stem of individual pieces of fruit prior to their being received in container or bag 22. However, it is to be understood that the generally circular first section 26 of second hoop member 20 need not be sharpened or have a knife blade attached thereto as the closing of the second hoop member 20 around the fruit to grasp the stem of the fruit will clamp the stem, and the fruit will be separated from the tree by a slight pull on pole 12.

Member 24 for actuating second hoop member 20 is attached to third section 32 of second hoop member 20 through opening 34 therein. Member 24 may be of flexible material such as rope or of a rigid material such as steel. The preferred embodiment of the invention includes a rope (nylon, hemp, etc.) one-eight to one-quarter inch in diameter for actuating second hoop member 20. Rope 24 is preferably of a length approximately that of the maximum length of telescoping pole 12. A handle 40 (FIG. 2) having a slit 42 therein for receiving rope 24 may be used for grasping by a person to pull on rope 24 to actuate second hoop member 20 to cause second hoop member 20 to pivot and move toward first hoop member 14 to close around the fruit and grasp the stem of the fruit to pick the fruit from the tree. To secure the loose end of the rope to the handle it is only necessary to loop a few turns of the rope around the handle. As an alternative to handle 40 (FIG. 2) the fruit picker of the present invention might be provided with a manually operated squeeze handle assembly 44 (FIG. 4) attached to the lowermost section 46 of telescoping pole 12. Squeeze handle assembly 44 includes a lever handle 41 having an extending portion 43 provided with a locking mechanism 45 at the end thereof. The handle 41 and extending portion 43 is pivotally mounted to a support member 47 which is secured to pole 12. Locking mechanism 45 includes a threaded, tapered split member 48 (FIG. 7) comprised of a pair of half-sections 49 having the rope 24 threaded through the center of the split sections. A nut 51 is carried around the threaded half-sections to squeeze the rope between the half-sections. In this embodiment (FIGS. 1 and 4), each of upper section 18 and lowermost section 46 of telescoping pole 12 includes a guide element 50 which can be used to keep rope 24 substantially parallel to telescoping pole 12. Of course, the embodiment of FIGS. 1-3 could likewise be provided with such guide elements 50. A separate guide element in the form of an opening 53 may be provided through upper section 18 of pole 12 in the embodiment illustrated in FIGS. 1, 2 and 4.

The upper section 18 of telescoping pole 12 may have an extension 52 (FIGS. 2, 3, 4 and 5) secured thereto for supporting both first hoop member 14 and second hoop member 20. As best shown in FIG. 3, extension 52 is secured to upper section 18 of telescoping pole 12 through an opening 54 in upper section 18 which receives a bolt 56 and butterfly nut 58 which provides a lock for securing extension 52 and first hoop member 14 in any desired position. Extension 52 provides an adjustment feature which permits use of the fruit picker of the present invention in environments where the operator is not holding pole 12 in a substantially vertical position while standing on the ground. This adjustment feature permits use of the fruit picker of the present invention when the operator might be on a ladder or structure such as steps or a porch adjacent a tree to hold pole 12 in an almost horizontal position when picking fruit 60 from a tree 62.

In operation, the operator adjusts telescoping pole 12 to its desired height and accordingly adjusts rope 24 with respect to handle 40 (FIG. 2) or 44 (FIG. 4). The operator then places first hoop member 14 to a position slightly above the piece of fruit 60 to be picked with the container or bag 22 attached to second hoop member 20 being placed slightly below such piece of fruit 60 so that the stem of the fruit 60 will be positioned between the first hoop member 14 and second hoop member 20. The operator then pulls on handle 40 (FIG. 2) or squeezes handle 44 (FIG. 4) which causes second hoop member 20 to move relative to first hoop member 14 to close around the fruit 60, with second hoop member 20 and first hoop member 14 acting like a pair of jaws, to grasp the stem of the fruit to separate or sever the stem of the fruit 60. Since container or bag 22 is below the fruit 60, after the stem is separated or severed, fruit 60 will fall a small distance into container or bag 22. The operator will then go on to other pieces of fruit 60 and follow the same procedure until the container or bag 22 is filled, at which time the operator empties container or bag 22.

While the above description constitutes preferred embodiments of the present invention, it will be appreciated that the invention is susceptible to modification, variation and change without departing from the proper scope and fair meaning of the accompanying claims.

I claim:

1. A portable fruit picker comprising:
   a pole having an upper end and a lower end;
   a first hoop member rigidly mounted on said upper end of said pole in nonplanar relationship to said pole and defining a generally circular enclosed area;
   a second hoop member pivotally mounted on said upper end of said pole below said first hoop member and including a first section extending forwardly from said upper end of said pole and a second section extending rearwardly of said upper end of said pole, said first section of said second hoop member defining a generally circular enclosed area of a size and configuration substantially identical to said enclosed area of said first hoop member, said second section of said second hoop member including a distal end having an opening therein;
   a flexible filament secured to said distal end of said second section of said second hoop member for pivotally moving said second hoop member for engagement of said generally circular enclosed areas of said first and second hoop members with the stem of a piece of fruit trapped between said enclosed areas;
   fruit receiving means secured to and disposed below said first section of said second hoop member for receiving and holding fruit falling by gravity after said engagement of said enclosed areas of said first and second hoop members; and
   a blade mounted on said generally circular enclosed area of said first section of said second hoop member for severing said stem of said fruit.

2. The portable fruit picker of claim 1 wherein a handle assembly is connected to said flexible filament.

3. The portable fruit picker of claim 2 wherein said handle assembly is suspended on said flexible filament near said lower end of said pole.

4. The portable fruit picker of claim 2 wherein said handle assembly includes a lever fixed to said lower end of said pole and clamping means associated with said lever for engaging said flexible filament, whereby responsive to pivotal movement of said lever said handle assembly pulls on said flexible filament to move said second hoop member relative to said first hoop member.

5. The portable fruit picker of claim 4 wherein said pole comprises a plurality of telescoping sections of different sizes with the section of largest size forming said lower end of said pole and the section of smallest size forming said upper end of said pole.

6. The portable fruit picker of claim 2 wherein said upper end of said pole includes an extension element pivotally secured thereto for supporting said first and second hoop members and means for providing an angular adjustment between said first hoop member and said pole.

7. The portable fruit picker of claim 6 wherein said handle assembly is suspended on said flexible filament near said lower end of said pole.

8. The portable fruit picker of claim 6 wherein said handle assembly includes a lever fixed to said lower end of said pole and clamping means associated with said lever for engaging said flexible filament, whereby responsive to pivotal movement of said lever said handle assembly pulls on said flexible filament to move said second hoop member relative to said first hoop member.

9. The portable fruit picker of claim 1 wherein said first hoop member is mounted on said upper end of said pole at an angle in the order of 130 to 160 degrees relative to said pole.

* * * * *